(12) United States Patent
Kessel

(10) Patent No.: US 10,333,641 B2
(45) Date of Patent: Jun. 25, 2019

(54) RECEIVER

(71) Applicant: NXP B.V., Eindhoven (NL)

(72) Inventor: Martin Kessel, Dresden (DE)

(73) Assignee: NXP B.V., Eindhoven (NL)

(*) Notice: Subject to any disclaimer, the term of this patent is extended or adjusted under 35 U.S.C. 154(b) by 747 days.

(21) Appl. No.: 14/495,324

(22) Filed: Sep. 24, 2014

(65) Prior Publication Data
US 2015/0092767 A1     Apr. 2, 2015

(30) Foreign Application Priority Data

Oct. 1, 2013 (EP) ..................... 13186918

(51) Int. Cl.
| | |
|---|---|
| *H04J 3/06* | (2006.01) |
| *H04J 3/12* | (2006.01) |
| *H04L 1/00* | (2006.01) |
| *H04L 1/20* | (2006.01) |
| *H04H 20/22* | (2008.01) |
| *H04H 20/42* | (2008.01) |

(52) U.S. Cl.
CPC .......... *H04J 3/0602* (2013.01); *H04H 20/22* (2013.01); *H04H 20/426* (2013.01); *H04J 3/12* (2013.01); *H04L 1/0047* (2013.01); *H04L 1/20* (2013.01)

(58) Field of Classification Search
CPC ...... H04H 20/22; H04H 20/426; H04J 3/0602
See application file for complete search history.

(56) References Cited

U.S. PATENT DOCUMENTS

| | | | | |
|---|---|---|---|---|
| 4,380,071 A | * | 4/1983 | Odaka ................ | G11B 20/1809 375/242 |
| 8,839,310 B2 | | 9/2014 | Ramaswamy | |
| 2002/0080895 A1 | | 6/2002 | Lindberg | |
| 2007/0019579 A1 | | 1/2007 | Xu et al. | |
| 2011/0164513 A1 | * | 7/2011 | Lecki ................ | H04W 52/0245 370/252 |
| 2014/0335806 A1 | | 11/2014 | Kessel | |

FOREIGN PATENT DOCUMENTS

| | | |
|---|---|---|
| CN | 1929615 A | 3/2007 |
| CN | 101164271 A | 4/2008 |
| EP | 1 139 564 A2 | 10/2001 |
| EP | 1 696 575 A1 | 8/2006 |

OTHER PUBLICATIONS

Wikipedia; "Time Slicing (digital broadcasting)"; retrieved from the Internet http://en.wikipedia.org/wiki/Time_slicing_%28digital_broadcasting%29 ; 4 pages (Sep. 11, 2014).
Etsi; "Digital Video Broadcasting (DVB)—DVB-H Implementation Guidelines"; Retrieved from the Internet http://www.etsi.org/deliver/etsi_tr/102300_102399/10237/01.04.01_60/tr102377v010401p.pdf; 118 pages; (Jun. 2009).
Extended European Search Report for appln. 13186918.2 (dated Dec. 20, 2013).
Result of consultation communication from counterpart application EP 13 186 918.2; 7 pages; (dated Sep. 12, 2016).

* cited by examiner

*Primary Examiner* — Zhensheng Zhang

(57) ABSTRACT

A receiver node for use in a digital broadcast system, comprising a receiver configured to receive a signal containing a service encoded with an error correcting code for decoding and wherein said receiver is further configured to ignore the signal during an ignore period, the node configured to use said error correcting code and the encoded service received outside the ignore period to reconstruct the part of the service ignored by the receiver.

20 Claims, 3 Drawing Sheets

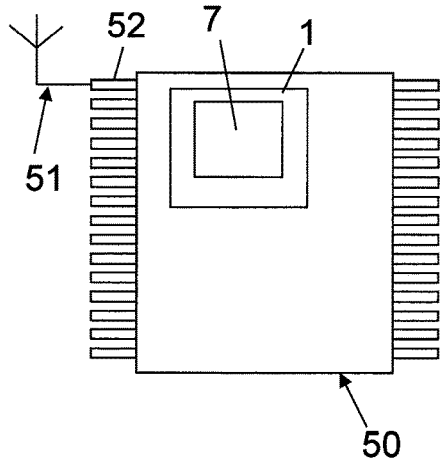
Fig. 4
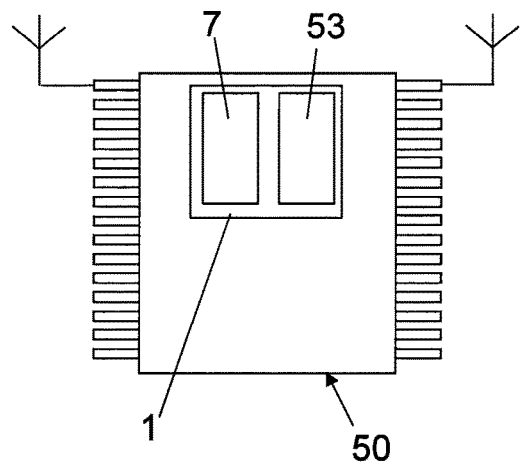
Fig. 5
Fig. 6
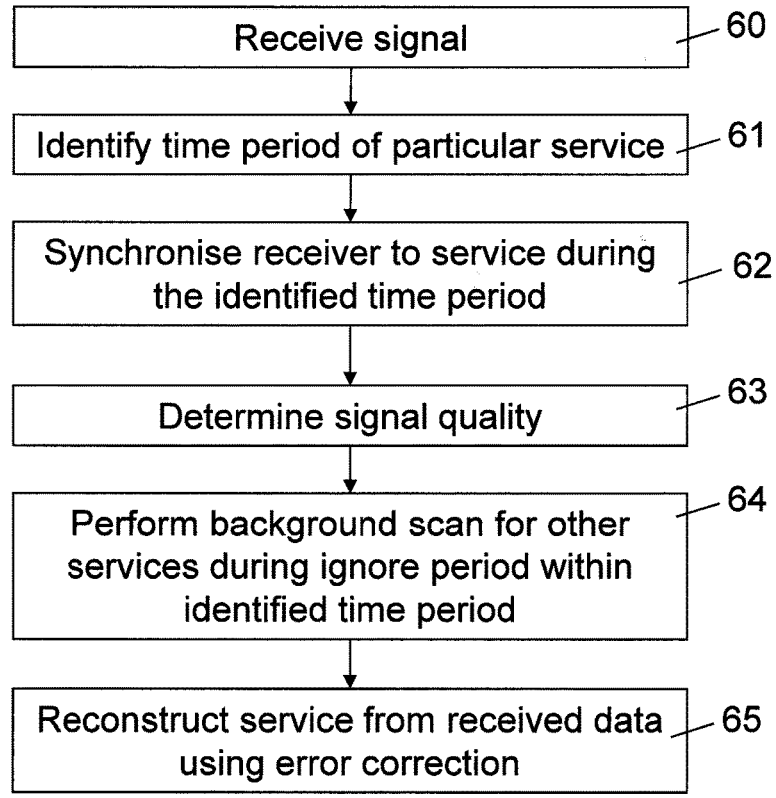

RECEIVER

CROSS-REFERENCE TO RELATED APPLICATIONS

This application claims the priority under 35 U.S.C. § 119 of European patent application no. 13196019/2, filed on Oct. 1, 2013, the contents of which are incorporated by reference herein.

This invention relates to a receiver node for use in a digital broadcast system. In particular, it relates to a receiver node configured to receive a signal including a plurality of time-multiplexed services, said services encoded with an error correcting code. The invention also relates to an integrated circuit incorporating said receiver node and a method of operating a receiver node in a digital broadcast system and a digital broadcast receiving device.

Digital broadcast systems can be used to provide radio and television services, for example. A plurality of services may be provided in a signal by way of multiplexing. Time slicing is a type of time division multiplexing used in the Digital Audio Broadcasting (DAB) system. In such a system, the services, which may comprise different radio stations, are assigned a broadcast time period in a broadcast signal. Thus, each service is transmitted as a series of time separated bursts which can be reconstructed to form a continuous audio service, for example. Time slicing is advantageous as a receiver device, once synchronised with the service it wishes to receive, can be switched off in the time in between the bursts that correspond to the desired service, thereby saving power.

It is desirable for receiver devices to determine other services that are available in the broadcast signal or other broadcast signals for selection by the user. In some devices, the receiver is used to scan for other services during the times between the bursts corresponding to the desired service. This is useful as the receiver can then be aware of other services that are available for selection by a user. It can also scan for services available from other transmitters so that a handover of service between transmitters can be completed.

It is known to provide receiver devices with two receivers thereby allowing the device to synchronise or "tune" one of the receivers to a desired service for providing to a user and use the second receiver for scanning for other services. However, the provision of an additional receiver for scanning is costly, particularly in terms of silicon area of the required electronics.

According to a first aspect of the invention we provide a receiver node for use in a digital broadcast system, comprising a receiver configured to receive a signal containing a service encoded with an error correcting code for decoding and wherein said receiver is further configured to ignore the signal during an ignore period, the node configured to use said error correcting code and the encoded service received outside the ignore period to reconstruct the part of the service ignored by the receiver.

This is advantageous as the receiver can be controlled such that it does not receive all of the signal provided. The receiver node actively ignores a portion of the signal it wishes to receive despite the signal being available for receipt, whether or not the signal is degraded by noise or interference. This is advantageous as the receiver can be used for purposes other than receiving the desired service, such as for background scanning for other services. The error correcting code is relied upon to reconstruct the particular service compensating for the part of the signal ignored by the receiver. This enables a single receiver to receive a desired service as well as scan for other available services.

The receiver node may be configured to receive a signal containing a plurality of services which are time-multiplexed to form said signal, and the receiver is configured to identify time periods in the signal in which a desired service(s) is present for receipt by the receiver and wherein the ignore period comprises a portion of at least one of the identified time periods. This is advantageous when receiving time-multiplexed signals as the receiver can be controlled such that it does not receive all of the signal provided over the time period corresponding to the desired service. This is particularly advantageous in circumstances where other services, possibly from other transmitters, may be synchronous with or overlap in time with the time slots in which the service being received is present. By ignoring a portion of the signal the node is trying to receive, the receiver has capacity to scan for other services that may be broadcast in sync, such as in a synchronous time slot, with service being received.

The receiver node may be configured to, during the ignore period, use the receiver to perform a background scan for other services. The ignore period therefore comprises a background scanning period. The other services may be present in the signal being received or may be present in signals from other transmitter nodes to the one providing the currently received signal. Scanning for services provided by neighbouring transmitter nodes is advantageous as a handover between transmitter nodes can be effectively completed where desirable. The background scan may include identifying a service list, obtaining information relating to other services or extracting data from other services.

The receiver node may be configured to determine and possibly implement an ignore period in each time period in the signal in which the particular service is present for receipt by the receiver.

The ignore period may comprise a time continuous period. The time continuous ignore period may be provided in each identified time period. This is advantageous as it provides a continuous block of time in which the receiver can be used for other purposes.

The ignore period may be implemented periodically or with a predetermined sequence of gaps between successive ignore periods. Alternatively, the ignore period may be implemented at random time intervals. The temporal position of the ignore period in the identified time period may be fixed or, alternatively, may be varied over the identified time periods. This may be advantageous for successfully identifying other services that may be available to the receiver node from neighbouring transmitter nodes, for example.

The duration of the ignore period may be controlled such that the receiver can perform its alternate function during the ignore period. If the ignore period is too long, the error correcting code may not have the capability to reconstruct the service from the part of the signal that was received by the receiver (and not ignored). If the ignore period is too short, then reconstruction of the signal is more reliable but the scanning for other available services may be hindered.

The receiver node may be configured to process the signal received by the receiver by adding dummy information to the received signal over the ignore period. The presence of the ignore period means that the signal received by the receiver is incomplete. The receiver therefore advantageously fills in the missing portion of the signal with dummy information in place of the signal that would have been received if the ignore period was not employed. An error correction encoder may have a fixed protection rate and the rate can be adapted by removing some of the bits of the data stream, which are "reconstructed" by applying dummy information on the receiver side. This process is call puncturing and de-puncturing. The dummy information in the present invention is used to compensate for the action of the receiver in ignoring part of the received signal rather than puncturing/depuncturing of the signal by virtue of action by the transmitter.

The receiver node may be configured to reconstruct the service received during each identified time period by decoding the service using the error correcting code to correct the dummy information. This is advantageous as the receiver node is able to use the error correcting code used to form the signal to identify and correct the dummy information thereby reconstructing the information representing the service. The error correcting code may a forward error correction code (FEC).

The signal may be interleaved with respect to time and the receiver node may be configured to de-interleave the signal after the dummy information has been added and prior to reconstructing the service by decoding using the error correcting code. Interleaving distributes the information in the signal over time. Thus, while the ignore period may be a continuous period of time, when de-interleaved, the ignored parts of the signal are not time-continuous. This is advantageous as error correcting codes, such as FEC, may perform better when the "errors" in the signal (in this case the added dummy information) are distributed over the signal.

The receiver node may be configured to use a measure of the quality of the signal received by the receiver to control the duration of the ignore period. This is advantageous as the receiver node can be configured to assess the likelihood of the error correcting code being able to successfully reconstruct the signal. This enables the node to control the ignore period accordingly so that less of the signal is ignored in the event the reception quality is low, for example, to give a decoder a better chance of successfully decoding the data using the error correcting codes.

The receiver may be configured to implement the ignore period when the measure of the quality of the signal is above a predetermined threshold and, if not, the receiver is configured not to ignore the signal. Thus, the ignore period may only be employed when the signal quality is good enough for the error correcting coding to be effective.

The plurality of time-multiplexed services may be time sliced and the receiver node may be configured to synchronize the receiver with the time slices that correspond to the desired service. The identified time periods therefore correspond to the time slices in the time sliced signal.

The receiver node may be configured to use the receiver for background scanning outside of the identified time periods that correspond to the desired service.

The receiver node may be configured to provide the desired service to a user.

The receiver node may be configured to identify further time periods in the signal in which one or more further services are present for receipt by the receiver and receive at least one of those further services in addition to the desired service, wherein the receiver node is configured to select a further ignore period in the at least one further service, the further ignore period comprising a portion of the further time period in which the receiver ignores the signal. In some circumstances the receiver node receives a plurality of services while providing one of the services to a user. This enables the receiver node to switch quickly between services. Thus, the invention has application in circumstances where the receiver node is not just receiving the bursts of signal corresponding to the desired service presented to the user, but also when a plurality of or all of the services contained in a signal are received.

The receiver node may include a further receiver and wherein said ignore period is used by the receiver and the further receiver for performing a function other than receiving the service that is ignored during the ignore period.

According to a second aspect of the invention we provide a method of operating a receiver node in a digital broadcast system, wherein the receiver node is configured to receive a signal containing a service encoded with an error correcting code, the method comprising receiving the encoded service;

ignoring part of the signal that contains the encoded service during an ignore period;

using said error correcting code and the encoded service received outside the ignore period to reconstruct the part of the service ignored by the receiver and, optionally, performing a background scan for other services during the ignore period.

According to a third aspect of the invention we provide a digital broadcast receiving device having a tuner incorporating the receiver node of the first aspect of the invention.

According to a further aspect of the invention we provide an integrated circuit assembly incorporating the receiver node of the first aspect of the invention.

The integrated circuit assembly may comprise a single integrated circuit having the receiver node integrated thereon or the assembly may comprise a plurality of integrated circuits configured to be connected together to provide the function of the receiver node.

The integrated circuit assembly may comprise two or more discrete integrated circuits or, alternatively, the receiver node may be provided on a single integrated circuit.

BRIEF DESCRIPTION OF THE DRAWINGS

There now follows, by way of example only, a detailed description of embodiments of the invention with reference to the following figures, in which:

FIG. 4 shows a diagram of a receiver node formed on an integrated circuit and having a single receiver;

FIG. 5 shows a diagram of a receiver node formed on an integrated circuit and having two receiver nodes; and FIG. 6 shows a flow chart illustrating an example method performed at the receiver node.

FIG. 1 shows a receiver device 1 including a receiver node 2 for receiving a broadcast signal 3. The receiver device 1 may comprise a digital broadcast receiving device such as a digital radio. The receiver node 2 is configured to receive the signal 3 which is broadcast by a first transmitter 4. In this example, the broadcast signal 3 contains a plurality of services, such as radio stations, for receipt by the receiver node 2. The broadcast signal is a Digital Audio Broadcast (DAB) signal and the services contained therein are time sliced. Time slicing allows the first transmitter 4 to broadcast a plurality of services by transmitting a burst of data for each service in a time sequential manner and thus comprises a form of time-division multiplexing. FIG. 1 shows a further transmitter 5 which also broadcasts a signal 6 containing services for receipt by the receiver node 2. The signal 6 may also contain a plurality of time-sliced services. The first transmitter 4 may cover a first geographical area and the further transmitter 5 may cover an adjacent geographical area, which may overlap with the first geographical area. While in this example the signal comprises a time-division multiplexed signal, the invention has application with other signals that use error correcting encoding, such as signals that contain a continuously broadcast service.

Figure 1:
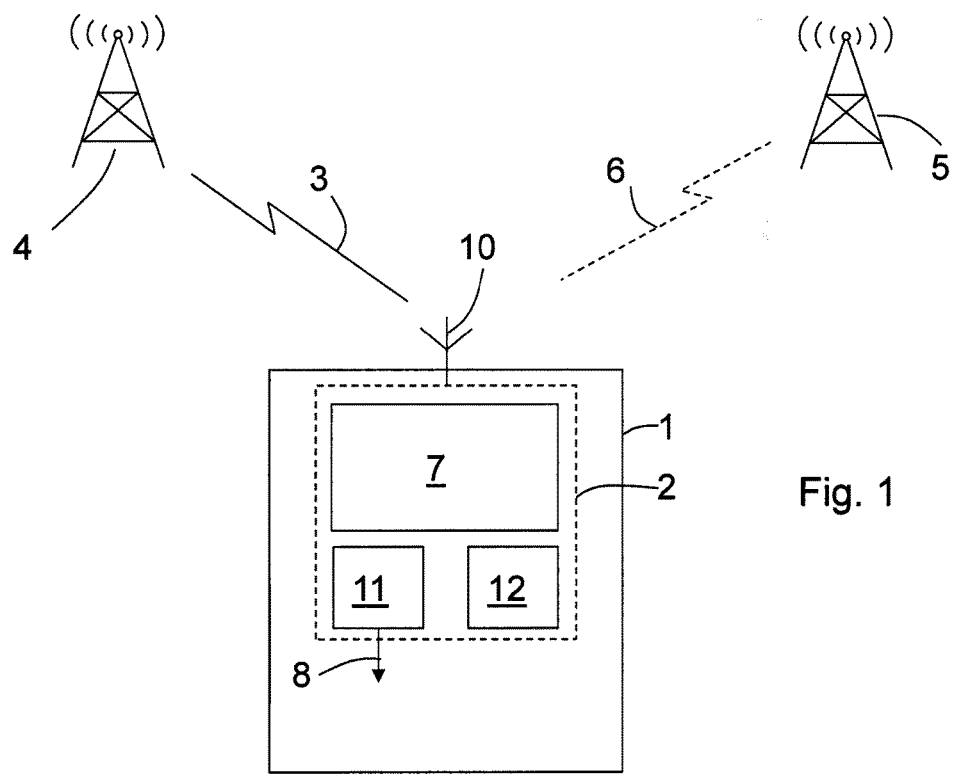
FIG. 1 shows a schematic view of an example receiver node.

The receiver node 2 includes a single receiver 7 for "tuning" into a particular service and providing the service to the receiver device 1 for presenting to a user, as represented by arrow 8. The receiver 7 receives the signal via an aerial 10.

Figure 2:
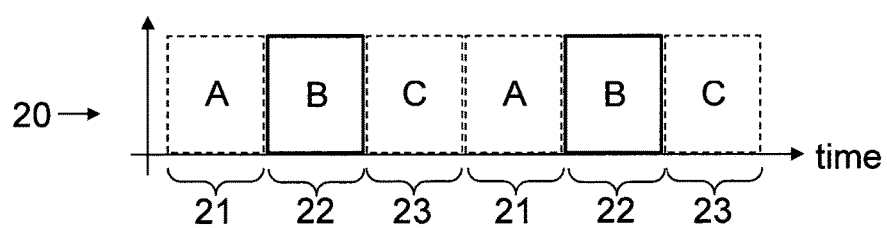
FIG. 2 comprises a diagram showing the use of an ignore period.
Figure 2:
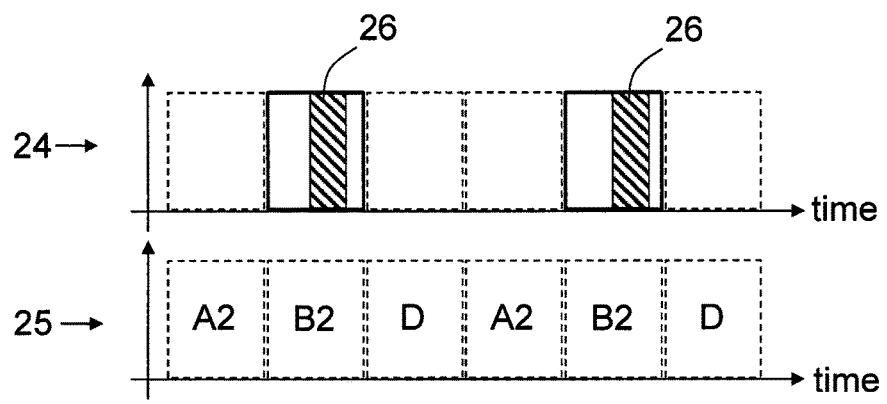

FIG. 2 shows a representation of the time sliced services provided by the transmitters 4 and 5. Plot 20 shows the three services, "A", "B" and "C", provided by transmitter 4 which are time sliced and the slices are shown broadcast sequentially. The receiver 7 is configured to identify one of the time periods 21, 22 and 23 in the signal 3 in which the particular service is present. In this example, the user has set the receiver to receive service "B". Accordingly, the receiver 7 synchronises with the time period 22 (which may be termed the "service time period") such that it is set to receive the part of the signal that includes service B. This is shown in plot 24. The receiver 7 is dedicated to receive service "B" during the time period 22 (as shown by the solid lines in plot 24). During the time periods 21 and 23, the receiver does not need to receive the signal 3 as they do not contain the desired service (as shown by the dashed lines in plot 24). During the time periods 21 and 23 the receiver may be switched off or may be used for other purposes, such as background scanning for other services. Plot 25 shows the time sliced services provided by the further transmitter 5. The services comprise service A2, which is the same as service A provided by the first transmitter 4, service B2 which is the same as service B provided by the first transmitter 4 and service D, which comprises a service not provided by transmitter 4. During the time periods 21 and 23 the receiver 7 can be used to perform a background scan and may therefore identify the existence of services A and C from transmitter 4 and services A2 and D from the transmitter 5. During time period 22, the receiver is dedicated to receiving service B rather than scanning for other services but uses an ignore period so that background scanning can be performed.

The receiver 7 is configured to determine an ignore period 26 (shown in plot 24 of FIG. 2) which comprising a portion of at least one of the identified time periods in which the receiver 7 ignores the signal. In this example, during the ignore period 26, the receiver 7 is configured to scan for other services. Accordingly, the receiver 7 is able to identify service B2 provided by the further transmitter 5. Without the ignore period, the receiver 7 would not be able to identify service B2 as it happens to be broadcast at the same time as the service B, which the receiver 7 is set to receive. The use of an ignore period 26 is advantageous as without it an additional receiver would be necessary to perform the background scan during the time period 22.

With reference to FIG. 1, the receiver node 2 includes a decoder 11 for decoding the signal received by the receiver 7 and a controller 12 for controlling the receiver 7 to implement the ignore period and perform background scanning. It will be appreciated that the decoder 11 may form part of the receiver 7 as may the controller 12. Alternatively, the controller 12 may be external to the receiver node 2.

Figure 3:
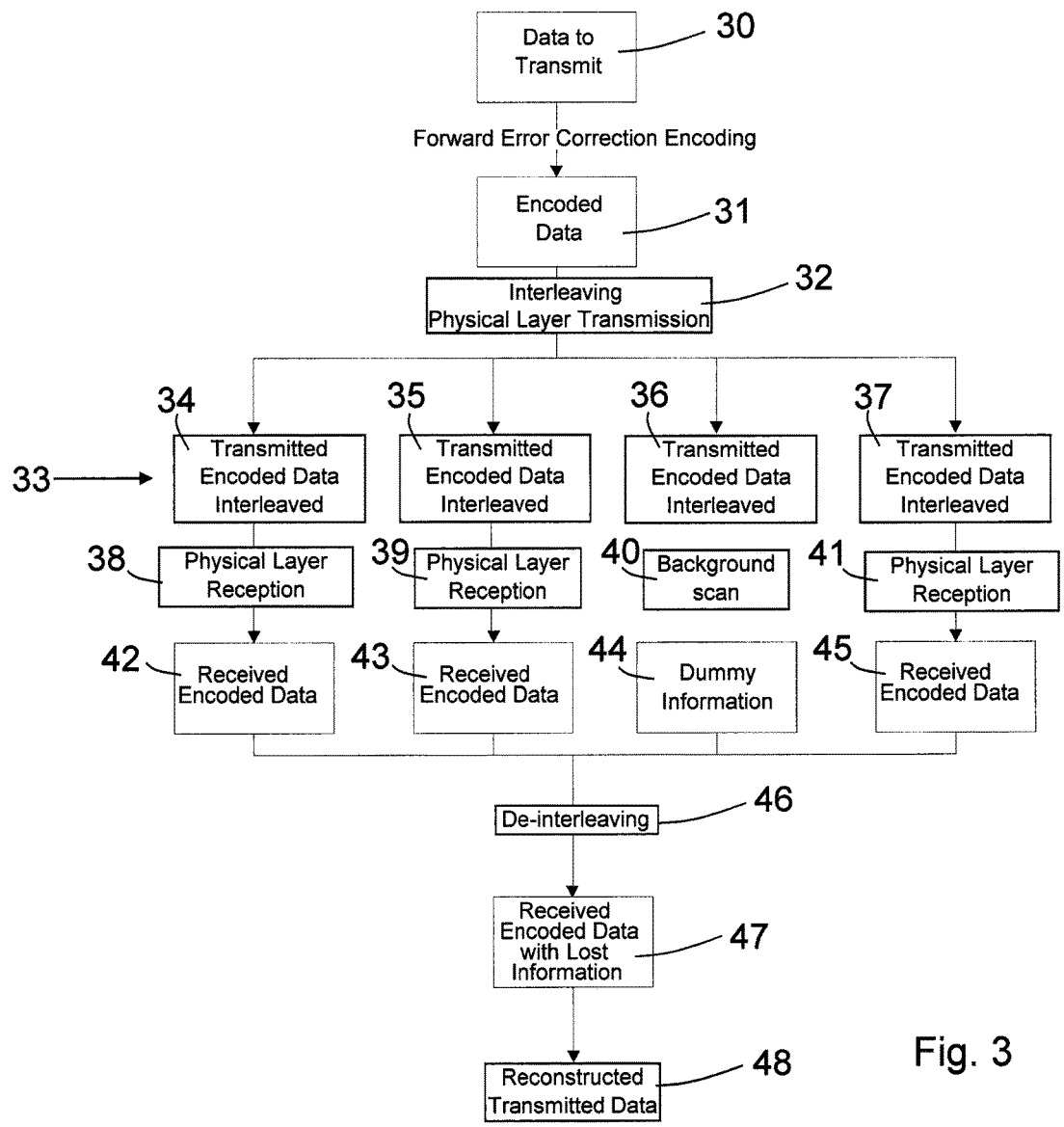
FIG. 3 shows a diagram representing the data flow from a transmitter node to the receiver node.

FIG. 3 shows the flow of data from the transmitter 4 to the receiver node 2. Service providers provide services to be transmitted 30. The services are "sliced" into time slices and are encoded 31 using an error correcting encoding scheme, which in this example comprises Forward Error Correction (FEC). The encoded data 32 is interleaved with respect to time such that time adjacent portions of the encoded data are distributed over the interleaved time slice and the signal is then transmitted. The above described steps are standard in a DAB system and will not be described in more detail herein.

The transmitted data 33 shown in FIG. 3 represents the signal broadcast over time period 22. The signal can be considered to be broadcast over a plurality of slots (which form the time period 22) comprising a first slot 34, a second slot 35, a third slot 36 and a fourth slot 37. In this example, the ignore period 26 comprises the period covered by the third slot 36. It will be appreciated that the temporal location of the ignore period in the service time period may be varied randomly, or sequentially over the various slots. The variation may occur at each and every service time period or after a plurality of service time periods.

Thus, the controller 12 controls the receiver 7 such that it receives the data of the first slot 38, the second slot 39 and the fourth slot 41. The data representing the service transmitted in the third slot is ignored 40 because the controller 12 controls the receiver 7 such that it performs a background scan for other services rather than receiving the data broadcast in the third slot. It will be appreciated that provision of four time slots is an example and other numbers of slots, may be used in other encoding/broadcast schemes.

The controller 12 may receive the results of the background scan such that it is aware of other services available from the same transmitter 4 or other transmitters 5 than the one it is currently receiving a service from.

When considering the data received by the receiver 7 that represents service B, it will receive encoded data for the first slot 42, the second slot 43 and the fourth slot 45 but will have a time-continuous gap in the received, encoded and interleaved data due to the ignore period. The controller 12 fills the gap with dummy information 44. The received data, including the dummy information is de-interleaved 46 by the receiver 7. This has the effect of returning the received data back to its pre-interleaving order and also distributing the dummy information over the whole time period 22. The de-interleaved data is passed 47 to the decoder 11 where decoding is performed using the appropriate error correcting decoding scheme (FEC). The receiver node 1 relies on the capability of the error correcting code to correct errors in the received data 42, 43, 44, 45 and reconstruct each burst of the service B. The reconstructed data 48 representing service B is output by the decoder 11.

It will be appreciated that the quality of the signal received by the receiver node 1 can be affected over its transmission path. Information may be lost during transmission due to Gaussian noise, interference from other signals and changing transmission channel conditions such as channel fading, for example. Under real world conditions the reception condition changes from time to time quite rapidly. Thus, the quality of the signal also varies. The error correction coding is designed to compensate for this degradation to signal quality within limits. However, the use of the ignore period which, in effect, purposively degrades the signal quality by ignoring part of the data that could be received, may degrade the signal quality to a level where the service cannot be successfully reconstructed using the error correcting coding. The controller 12 may therefore be configured to control the duration of the ignore period in response to a measure of the signal quality received by the receiver node 2. The controlling of the duration of the ignore period will control the quality of the signal, which can then be maintained above a minimum threshold where possible.

In a first example, the controller 12 is configured to receive a measure of signal quality. The measure may be determined by the decoder 11 and may comprise a bit error rate. If the measure of signal quality is equal to or above a threshold value, the controller may be configured to implement the ignore period at the receiver 7 so that the receiver can be used for background scanning or other uses. If the measure of signal quality falls below the threshold, the controller 12 may control the receiver 7 so that there is no ignore period and the receiver 7 is dedicated to receiving the signal over the whole time period the signal is broadcast. Thus, an ignore period of fixed duration is used or not used on the identified time periods depending on signal quality.

In a second example, the controller 12 is configured to control the duration of the ignore period as a function of the measured signal quality. In this example, if the signal quality decreases, the length of the ignore period is decreased. Likewise, if the signal quality increases the length of the ignore period is increased up to an upper limit. The upper limit may be 10%, 15%, 20%, 25% or more of the time of each time slice, for example. The function may be a continuous function, discontinuous function or a step function or other types of function. For example, the function may switch the ignore period between three or more durations; a first duration greater than a second duration greater than a third duration where the third duration may or may not be zero. When the measure of signal quality is above an upper threshold, the controller may set the ignore period at the first duration value. In this instance background scanning may be able to be performed effectively. When the measure of signal quality falls below the upper threshold but is above a lower threshold, the controller may set the ignore period at the second duration. An ignore period of the second duration may increase the quality of the signal processed by the decoder 11 but may result in the background scanning being perform less effectively and/or more slowly. If the measure of signal quality falls below the lower threshold, the controller may set the ignore period at the third duration, which may mean the use of an ignore period is halted. Accordingly, the receiver 7 will be set to receive all the information it is possible to receive for reconstructing the service. The background scanning for other services that are time synchronous with the currently received service will be halted by the absence of the ignore period. It will be appreciated that the receiver node may perform a background scan (or a user may request it to perform a background scan, for example, to update a service list) in preference to receiving the desired service.

FIG. 4 shows an integrated circuit 50 having the receiver node 1 integrated thereon. The receiver node 1 includes a single receiver 7 which may be configured to receive the signal from an antenna 51 connected to one or more pins 52 of the integrated circuit 50.

FIG. 5 shows an integrated circuit 50 having the receiver node 1 integrated thereon. In this example, the receiver node 1 includes two receivers 7 and 53. Thus the invention has application in two receiver systems as the use of the ignore period may free up capacity at either receiver for performing other functions or for saving power if either receiver is turned off.

FIG. 5 shows two antennas, one for each of the receivers 7, 53. However, it will be appreciated that the second antenna for the second receiver may not be necessary and the receivers may share a single antenna. In particular, there may be a "splitter" provided on a printed circuit board that the integrated circuit is mounted. Alternatively, the splitter may be present as part of the IC 50.

It will also be appreciated that the function of the receiver node may be split over several integrated circuits configured to be connected together that form an integrated circuit assembly. For example, a tuner may be provided on a first integrated circuit and a base band processor may be provided on another integrated circuit with the receiver 7 and decoder 11 and processor 12 functions distributed over the ICs.

FIG. 6 shows a flow chart illustrating the operation of the receiver node 2. Step 60 comprises receiving the signal from the transmitter. Step 61 comprises identifying the time period or slice in which a desired service is present. Step 62 comprises synchronising the receiver with the identified time period so that the service can be received. Background scanning for other services may be performed outside the identified time period. Step 63 comprises determining the signal quality to decide if an ignore period should be implemented during the identified time period. If so, the method proceeds to step 64 and the receiver is switched from receiving the signal so that it can be used for background scanning (or other uses). The receiver node can therefore effectively identify other services that may be available for receipt. This may be useful in a mobile DAB radio device, such as in a car, where the car may move between areas served by different transmitters. If the receiver node is well informed of other services that are available it can effectively switch to a service provided by a different transmitter to achieve better signal quality for example.

It will be appreciated that the time sliced services provided by transmitters 4 and 5 may not always be synchronously broadcast. Nevertheless, background scanning for services during an ignore period provides an effective and efficient means of identifying other services in a time sliced or time division multiplexed broadcast system or other broadcast system. In some systems, the receiver 7 is set to receive all of the services from the transmitter, such as to improve switching times between the services. Without use of an ignore period in each of the time periods that contain a service, such a system would require a second receiver to perform background scanning. Using the ignore period enables such a system to operate more effectively.

The invention claimed is:

1. A receiver node for use in a digital broadcast system, comprising a receiver configured to:
    receive a signal comprising a plurality of services which are time-multiplexed to form the signal, wherein the plurality of services comprise a desired service encoded with an error correcting code for decoding;
    ignore the signal during an ignore period;
    identify time periods in the signal in which the desired service is present for receipt by the receiver and wherein the ignore period comprises a portion of at least one of the identified time periods;
    use said error correcting code and the desired service received outside the ignore period to reconstruct a part of the desired service ignored by the receiver; and
    during the ignore period, use the receiver to perform a background scan for other services.

2. The receiver node as defined in claim 1, in which the ignore period is a time continuous period.

3. The receiver node as defined in claim 1, in which the receiver node is configured to process the signal received by the receiver by adding dummy information to the received signal over the ignore period.

4. The receiver node as defined in claim 1, in which the signal is interleaved with respect to time and the receiver node is configured to de-interleave the signal after the dummy information has been added and prior to reconstructing the desired service by decoding using the error correcting code.

5. The receiver node as defined in claim 1, in which the receiver node is configured to use a measure of the quality of the signal received by the receiver to control the duration of the ignore period.

6. The receiver node as defined in claim 5, in which the receiver is configured to implement the ignore period when the measure of the quality of the signal is above a predetermined threshold and, if not, the receiver is configured not to ignore the signal.

7. The receiver node as defined in claim 1, in which the plurality of time-multiplexed services are time sliced and the receiver node is configured to synchronize the receiver with the time slices that correspond to the desired service.

8. The receiver node as defined in claim 1, in which the receiver node is configured to provide the desired service to a user.

9. The receiver node as defined in claim 8, in which the receiver node is configured to identify further time periods in the signal in which one or more further services are present for receipt by the receiver and receive at least one of those further services in addition to the desired service, wherein the receiver node is configured to select a further ignore period in the at least one further service, the further ignore period comprising a portion of time period in which the receiver ignores the signal.

10. The receiver node as defined in claim 1 in which the receiver node is configured to determine an ignore period in each time period in the signal in which the desired service is present and available for receipt by the receiver.

11. A method of operating a receiver node in a digital broadcast system, wherein the receiver node is configured to receive a signal comprising a plurality of services including a first service encoded with an error correcting code, the method comprising:
ignoring the signal during an ignore period;
identifying time periods in the signal in which the first service is present for receipt by the receiver and wherein the ignore period comprises a portion of at least one of the identified time periods;
using said error correcting code and a first part of the first service received outside the ignore period to reconstruct a second part of the first service ignored by the receiver; and
during the ignore period, using the receiver to perform a background scan for other services.

12. An integrated circuit assembly incorporating a receiver node, the receiver node configured to:
receive a signal comprising a plurality of services which are time-multiplexed to form the signal, wherein the plurality of services comprise a desired service encoded with an error correcting code for decoding;
ignore the signal during an ignore period;
identify time periods in the signal in which the desired service is present for receipt by the receiver and wherein the ignore period comprises a portion of at least one of the identified time periods;
use said error correcting code and the desired service received outside the ignore period to reconstruct a part of the desired service ignored by the receiver; and
during the ignore period, use the receiver to perform a background scan for other services.

13. The integrated circuit assembly as defined in claim 12, in which the ignore period is a time continuous period.

14. The integrated circuit assembly as defined in claim 12, in which the receiver node is configured to process the signal received by the receiver by adding dummy information to the received signal over the ignore period.

15. The integrated circuit assembly as defined in claim 12, in which the signal is interleaved with respect to time and the receiver node is configured to de-interleave the signal after the dummy information has been added and prior to reconstructing the desired service by decoding using the error correcting code.

16. The integrated circuit assembly as defined in claim 12, in which the receiver node is configured to use a measure of the quality of the signal received by the receiver to control the duration of the ignore period.

17. The integrated circuit assembly as defined in claim 16, in which the receiver is configured to implement the ignore period when the measure of the quality of the signal is above a predetermined threshold and, if not, the receiver is configured not to ignore the signal.

18. The integrated circuit assembly as defined in claim 12, in which the plurality of time-multiplexed services are time sliced and the receiver node is configured to synchronize the receiver with the time slices that correspond to the desired service.

19. The integrated circuit assembly as defined in claim 12, in which the receiver node is configured to provide the desired service to a user.

20. The integrated circuit assembly as defined in claim 19, in which the receiver node is configured to identify further time periods in the signal in which one or more further services are present for receipt by the receiver and receive at least one of those further services in addition to the desired service, wherein the receiver node is configured to select a further ignore period in the at least one further service, the further ignore period comprising a portion of time period in which the receiver ignores the signal.

* * * * *